Figure 4:
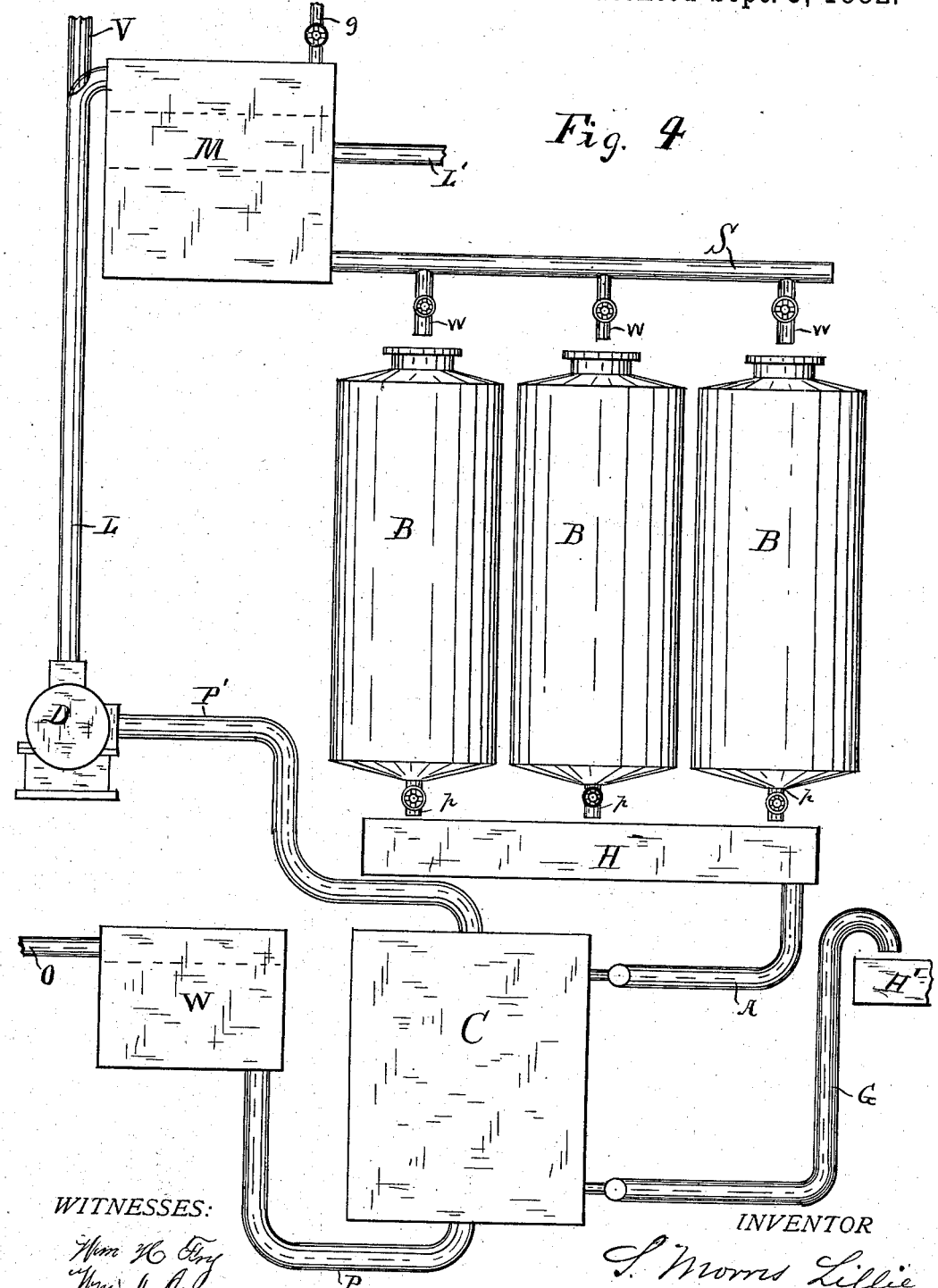

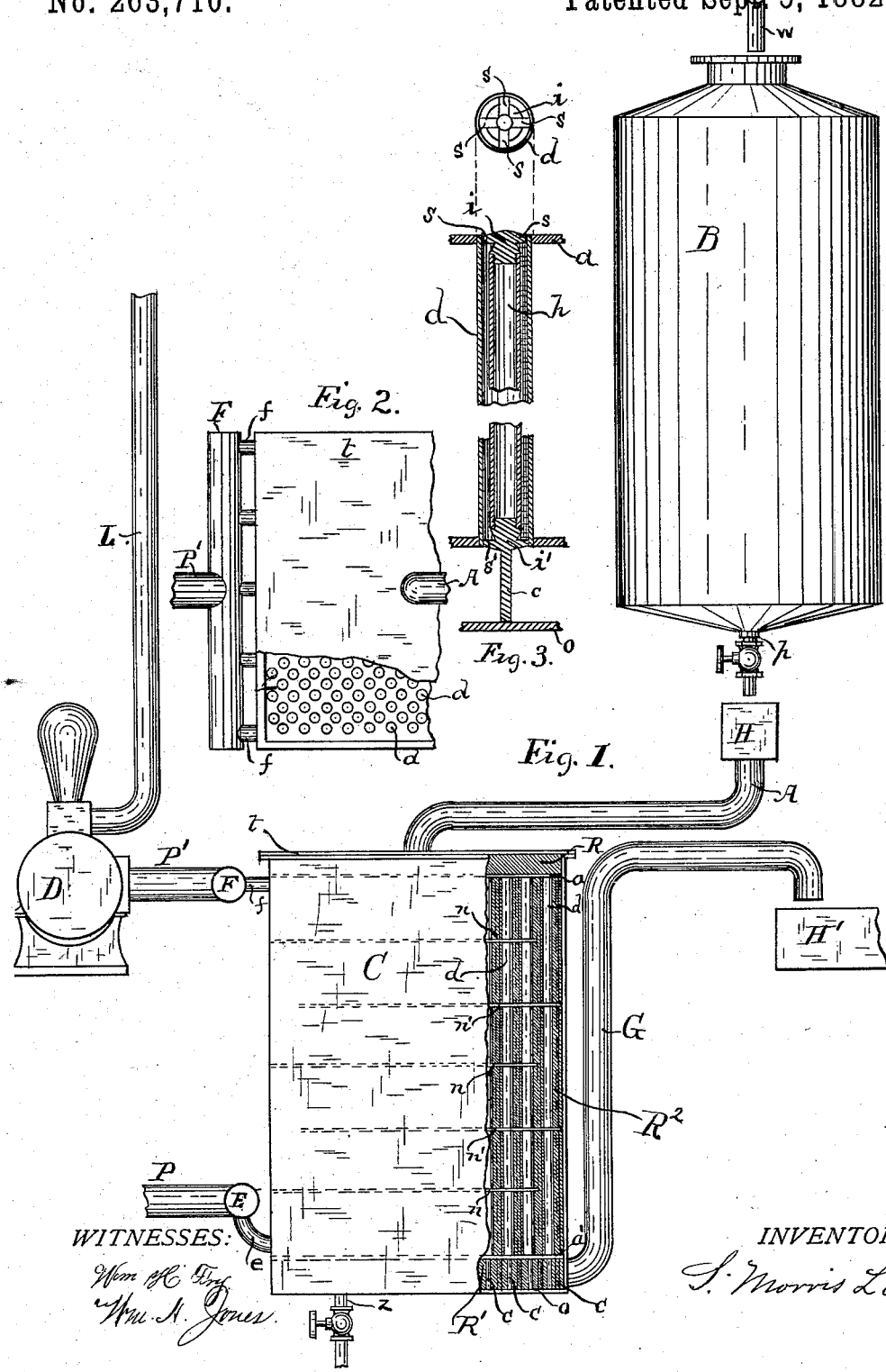

(No Model.)

2 Sheets—Sheet 2.

S. M. LILLIE.
PROCESS OF WASHING BONE BLACK IN SUGAR REFINERIES AND APPARATUS FOR CARRYING ON THE SAME.

No. 263,710.

Patented Sept. 5, 1882.

WITNESSES:

INVENTOR

ATTORNEY

UNITED STATES PATENT OFFICE.

S. MORRIS LILLIE, OF PHILADELPHIA, PENNSYLVANIA.

PROCESS OF WASHING BONE-BLACK IN SUGAR-REFINERIES AND APPARATUS FOR CARRYING ON THE SAME.

SPECIFICATION forming part of Letters Patent No. 263,710, dated September 5, 1882.

Application filed July 26, 1882. (No model.)

*To all whom it may concern:*

Be it known that I, S. MORRIS LILLIE, a citizen of the United States, residing at Philadelphia, in the county of Philadelphia and State of Pennsylvania, have invented a new and useful Process of Washing Bone-Black in Sugar-Refineries and Apparatus for Carrying on the Same, of which (the said process and apparatus) the following is a specification.

In the practice of the sugar-refineries the bone-black, having served for a filtration or decolorization of a batch of sugar-liquor, is washed with hot water, first, to remove all of the "sweet" from the black, which sweet-washings are saved; and then the washing is continued for a period to remove, as much as may be, from the black the impurities taken up by it from the sugar-liquors, after which the black is passed through the revivifying-kilns. These second washings—*i. e.*, after the sweet has been sufficiently removed from the black—have been either allowed to flow to waste, or else, in order to save a portion of the heat contained in them, the latter portions of them have been saved and used as part of the washing-water for another lot of black.

The object of my process and apparatus is to utilize the heat from all the washings, or from as much of them as is wished, and at the same time to avoid using the more or less impure washings of one batch of black as part of the washing-water for another batch, which washings are obviously not as desirable for the purpose as fresh water, as they carry back into the black some of the very impurities which it is desired to remove from it.

My process consists in leading the hot washings as they flow from the black through a suitable apparatus—such, for example, as that hereinafter to be described—by which the hot washings may be utilized, either in heating fresh water, which heated fresh water may be used for washing black or for other purposes of the refinery, or in heating the raw or other liquors of the refinery. The washings are allowed to run to waste from the apparatus, unless, indeed, it is the sweet-washings that are being used for heating the water or liquor, in which case, of course, the washings are saved. By this process the greater portion of the heat contained in the hot washings above that contained in an equal quantity of the fresh water or liquor may be recovered and utilized in heating the fresh water or liquor to the desired temperature for use, or to nearly the desired temperature.

In the drawings apparatus is illustrated by which my process for economizing the heat of the washings from the bone-black may be carried on.

Figure 1 shows a combination of apparatus for use in practicing my process. Figs. 2 and 3 are detached views of parts of that part of the apparatus in which the heat in the washings is transferred to the fresh water or to the sugar-liquor; and Fig. 4 is a combination of apparatus for practicing my process in heating fresh water, and for using the heated fresh water for washing bone-black.

In Fig. 1, B is a large vat or vessel, in which the black is washed. It is ordinarily the same vessel in which the filtration of liquor through the black has been carried on. Below, it has an eduction-pipe, $p$, which discharges into a trough, H, into which washings from one or more other vats may also be discharging at the same time. Above, the vat has an opening or suitable means for running hot water upon the upper surface of the black.

A is a conduit, which leads the washings to the apparatus C, in which they are utilized for heating fresh water or liquor.

D is a pump for taking the heated water or liquor from the apparatus C, and for delivering it through the main L at any desired destination, as in the case of the water to a heating-tank, if it is necessary that it should be additionally heated before being used, or in the case of, say, raw liquor to proper heating and defecating apparatus, in which it is to be treated prior to its filtration through the bag-filters.

The apparatus in which or by means of which the hot washings are used to heat the fresh water or liquor consists, speaking in general terms, of a water-tight case through which extend a series of vertical metal tubes opening above into a tray or box, and below opening into a box having a suitable discharge. There are proper communications through the walls of the case with its interior—one set near the top of the same and the other near the bottom— while in operation the hot washings are led into the tray above the tubes, and in flowing through the same into the receptacle below heat the fresh water or liquor, which enters the case through the connections near the bottom and is drawn off heated through those near the top.

At C, Fig. 1, is shown an elevation of this heating apparatus and of its connections, a portion of the front wall of the case being broken out to expose the interior to view. Fig. 2 is a part of the plan of the apparatus with a portion of its top plate, $t$, broken out; and Fig. 3 is a view of a detached part.

In the figures, C is a case divided by the horizontal partition-plates $a$ $a'$ into three compartments—viz., two shallow ones, one, R, at the top and one, R', at the bottom, and a deeper one, $R^2$, between the two. Tubes $d$ $d$, &c., extend vertically from the compartment R through the compartment $R^2$ to the compartment R', and afford a free communication between the two compartments R and R'. Each tube $d$ contains a concentric and easily-removable core, $h$, (see Fig. 3,) which is a vertical section through the axis of one of the tubes $d$, whereby the free cross-section of each tube is reduced to an annular form more or less thick, depending on the sizes of the tube and its core. The core shown in the drawings, Fig. 3, consists of a piece of metal tubing, $h$, having the proper outside diameter and cut somewhat shorter than its tube $d$. Into each end of the core-tube $h$ a plug or casting, $i$, is fixed, having a number of arms or spokes, $s$, radiating from that portion of it which projects from the end of the tube. The outer ends of the arms of each plug are on the circumference of a circle of the same or of a slightly-less diameter than that of the bore of the tube $d$, and when the core-tube is inserted in its tube $d$ the plugs $i'$ $i'$ and their radiating arms $s$ $s'$ fix the ends of the core-tube, and consequently the core itself, concentric with the interior of the tube $d$.

The core-tube is supported and is prevented from falling from its proper position by a rod, $c$, which projects from the under side of the lower plug, $i'$, and is of such a length that when the core is in the proper position the lower extremity of the rod $c$ will rest upon the bottom plate, $o$, of the lower compartment, R'. The rods $c$ should be of as small diameter as is consistent with a proper rigidity, so that the motion of the liquid that is to flow into and out of this compartment, as hereinafter to be described, may be as little impeded as possible.

The compartment $R^2$, through which the tubes $d$ $d$, &c., extend, contains a number of horizontal plates or shelves, $n$ $n'$, &c., located one above the other, and extending entirely across the compartment in one direction—i. e., from front to back—but only part way across from side to side, each plate touching one of the side walls of the case, but having its opposite edge a short distance from the opposite wall, and the plates $n$ are so arranged in this respect as to touch alternately opposite sides, the effect being to form in the compartment $R^2$ a circuitous channel, along which must flow any liquid that passes through the compartment $R^2$ from top to bottom, or vice versa.

A conduit, A, opens into the upper compartment, R. Another conduit, G, opens into the lower compartment, R'. A third, P', communicates with the interior of the compartment $R^2$, immediately below the partition-plate $a$, and above the upper one of the horizontal plates $n$ and through the side wall, which the latter touches, by means of the cross-main F and branches $f$, while a fourth, P, communicates in a similar manner, through the cross-main E and branches $e$, with the interior of the compartment $R^2$, immediately above the division-plate $a'$, and below the lowest one of the plates $n$ and through the wall, which the latter touches.

In the case illustrated in the drawings the number of the plates $n$ is such that the conduits P and P' communicate with the chamber $R^2$ through the same side wall. The object in having these conduits communicate with the chamber $R^2$ in this manner—i. e., through the cross-mains and branch pipes—is that the liquid flowing through the chamber may enter it and leave it more evenly distributed than would be the case did the conduits each open into it direct and at but one point. The conduits A and G might communicate with the compartments R R', respectively, after a similar fashion.

In Fig. 1 the conduit A is shown communicating with the trough H, into which the washings discharge from the vat B. The conduit G discharges on a level with the upper compartment, R, into the waste-water trough H'. The main P leads from a supply of the water or of the liquor that is to be heated, and the conduit P' leads to the pump D, whose eduction-main L delivers into the reservoir or heating-tank into which it may be wished to have the heated water or liquor go.

The operation of the above-described combination of apparatus in carrying on my process is as follows: The hot washings from the black in the vat B flow from the pipe $p$ into the trough H, whence they flow through the conduit A into the upper box, R, of the heater C, thence through the annular passages in the tubes $d$, and finally through the conduit G into the waste-water trough H'. The hot washings, while passing through the tubes $d$, give up their heat to the fresh water, which is simultaneously being drawn by the pump D through the chamber $R^2$ in a circuitous course among the tubes $d$ and around the plates $n$. The washings enter the apparatus C hot and issue from its discharge-conduit G more or less cooled, while the fresh water or the liquor, as the case may be, enters the apparatus comparatively cool and leaves it more or less heated, and is delivered by the pump D through the main L to the point desired.

The apparatus C may be used with the cores $h$ in the tubes $d$, or without them in, as indicated in Fig. 2; but a greater efficiency is obtained in the former case.

In Fig. 4 is shown a combination of apparatus more especially designed for utilizing the heated water in washing the black. B B, &c., form a series of vats in which the bone-black is washed, where eduction-pipes p deliver into the trough H. C is the heating apparatus, which receives the washings hot from the trough H and delivers them cooled into the waste-water trough H', and which also receives the fresh water that is to be heated from the tank W and delivers it to the pump D, by which it is elevated through the main L into the heating-tank M. The end of the main L projecting into the tank is provided with a float-valve, by which the height of the water in the tank regulates the flow of water from the main, and does not permit of the water reaching a greater height than the upper of the two broken lines; or the flow of water into the tank may be governed by the level of the water in the same by any other means, as by a float suitably connected with a valve in the steam-pipe of the pump D, so that when the water reaches a certain level in the heating-tank the valve will be closed and the pump stopped. The heating-tank M has also a second fresh-water-supply pipe, L', which receives its water from a source independent of the pump D. This pipe is furnished with a float-valve which closes when the water in the heating-tank reaches the level of the lower of the two dotted lines. The purpose which the water-main L' serves is to deliver water into the heating-tank whenever, for any reason, the supply from the pump D ceases or is insufficient in quantity. The main L has an extension, V, fitted with a suitable valve, (not shown,) which extension delivers into a reservoir above, into which any excess of heated water may be sent, or as much of it as for any reason may be wished.

The fresh-water tank W, from which the water to be heated flows to the heater C through the main P, receives water from a main, O, which is provided with a float-valve, by which the level of the water in the tank W is kept about even with the top of the heater C; and this, in connection with the pump D, drawing the water through the heater C, instead of forcing it through, prevents there being any heavy pressure in the apparatus C, due either to the head of water in the delivery-main L or to the pressure of water in supply-main O. The delivery of the cooled washings from the discharge-main G on about a level with the top of the heater C prevents any pressure in the heater due to the washings, and likewise insures the spaces in the heater C, that are designed for the washings, being kept filled with the same.

In Fig. 4 the course of the washings is through the case of the heater C, and that of the fresh water is upward through the tubes, instead of vice versa, as shown in Fig. 1. This is preferable when the fresh waters contain matters in solution that are likely to be precipitated when the water is heated, and so give rise to incrustations, for in this case the incrustations would be formed on the interiors of the tubes and on the surfaces of the cores in the same, both of which may at any time be easily gotten at for cleaning purposes, after removing the top plate, t, of the heater. If, however, the incrustations were formed on the exteriors of the tubes d, which would be the case were the courses of the washings and of the fresh water as shown in Fig. 1, they would be very difficult of removal, at least by mechanical means.

From the above, and from an examination of Fig. 4, it appears that, omitting exceptional cases, all of the water that flows into the heating-tank M, and consequently all that flows into the vats B, first passes through the heater C, and at precisely the same rate at which the water additionally heated in the tank M by steam from a steam-pipe, g, flows from the latter through the main S and branches W into the vats B, and that consequently while the washing is in progress the hot washings from the vats are continuously heating the fresh water that is to follow them through the vats.

In cases where one or more of the vats are being emptied of the hot water, prior to withdrawing the washed black from the same, and while at the same time no water is being drawn from the heating-tank, the water heated by the washings flowing from the vats during this time may be elevated through the extension V of the main L into a reservoir above, the valve in V (not shown in the drawings) having first been opened. In the same manner, whenever a greater economy of heat may be effected by passing a greater quantity of fresh water through the heater C than is wanted in the tank M, this excess may be sent to the reservoir above through the main V, there to be drawn upon for the purposes of the refinery.

Having described my invention, I claim as mine and wish to secure to myself by Letters Patent of the United States—

1. The within-described process of saving and utilizing the heat in the washings from the bone-black of sugar-refineries, consisting in employing the said washings to heat either fresh water to be used for the purposes of the refinery or the sugar-liquors of the refinery preparatory to further treatment, substantially as and for the purpose specified.

2. The within-described process of saving and utilizing the heat contained in the washings from the bone-black in sugar-refineries, consisting in employing the washings to heat fresh water, and in using the resulting heated fresh water for washing the sweetness and impurities from black through which a filtration of sugar-liquor has taken place, substantially as specified.

3. The within-described process of heating water for the purposes of a sugar-refinery, consisting in passing the water first through an apparatus in which it will be subjected to the heating action of the hot washings from the bone-black, and then through a heating-tank or other heating apparatus in which the required additional temperature will be imparted to it, substantially as specified.

4. The combination, with the vats in which, in sugar-refineries, the bone-black is washed with hot water, of an apparatus for receiving the hot washings as they flow from the vats, and operating to utilize the heat in the said washings for heating fresh water or liquor flowing through the said apparatus, substantially as specified.

5. The combination of the bone-black-washing vats B, heater C, heating-tank M, and apparatus for forcing water through the heater C into the heating-tank M, the combination acting substantially as specified.

6. The combination of the bone-black-washing vats B, heater C, water-tank W, supplied with water from a main regulated by a float-valve, heating-tank M, and pump D for drawing water through the heater C from the tank W, and for elevating the water to the heating-tank M, the combination operating substantially as and for the purpose specified.

S. MORRIS LILLIE.

Witnesses:
JOHN RODGERS,
JOHN W. BROCK.